Patented June 7, 1949

2,472,462

UNITED STATES PATENT OFFICE 2,472,462

PROCESS OF PREPARING PTEROIC ACID AND AMINO ACID AMIDES THEREOF

James H. Boothe, Pearl River, N. Y., assignor to American Cyanamid Company, New York, N. Y., a corporation of Maine No Drawing. Application May 3, 1947,
Serial No. 745,719

7 Claims. (Cl. 260—251)

The present invention relates to a new method of preparing organic acids. More particularly, it relates to a method of preparing pteroic acid and amino acid amides thereof.

Pteroic acid is the name used to describe the compound having the following somewhat unwieldy chemical name, 4([(2-amino-4-hydroxy-6-pyrimido [4,5-b]pyrazyl)methyl]amino) benzoic acid.

An important amino acid amide of pteroic acid is that formed by glutamic acid and pteroic acid commonly called pteroylglutamic acid. This compound and methods of synthesizing it have been described by the present inventor and coworkers in Science, vol. 103, May 31, 1946, pages 667–669. As also noted there, pteroic acid is active for Streptococcus faecalis R and pteroylglutamic acid is active for Streptococcus faecalis R as well as L. gasei and is useful in the treatment of certain diseases of the circulatory system.

The new process of the present invention involves several reactions which can be illustrated as follows:

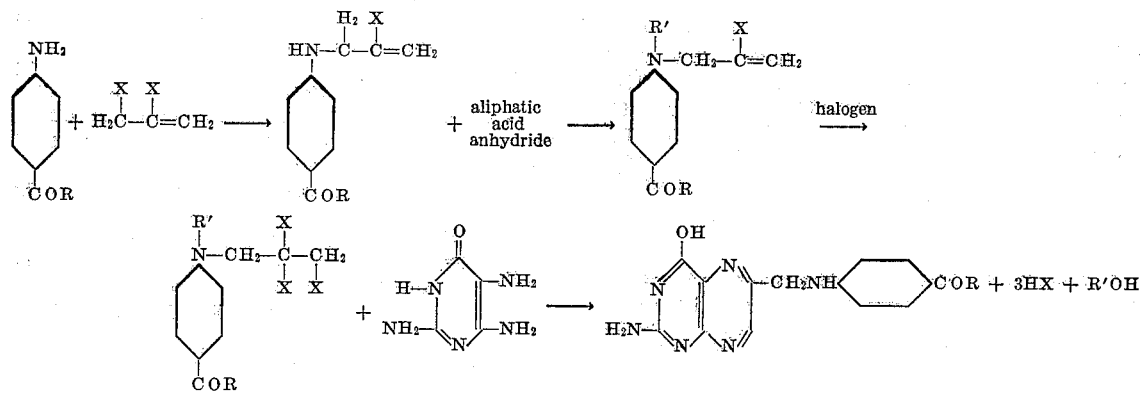

in which R' is an acyl radical, X represents one of the halogens such as chlorine or bromine, and R represents an —OH group or an amide forming radical, such as —NHR" which represents the residue of an amino acid. The various steps shown above are described in detail in the example.

The compound 2,4,5-triamino pyrimidone-6 is known. It may exist in whole, or in part, in one or more tautomeric or resonant forms, such as, for example, 2,4,5-triamino-6-hydroxypyrimidine. As would be expected, these tautomeric forms react similarly and reference hereinafter to the one tautomer includes the like use of any of the various tautomers. The compound can also be used in the form of one of its acid salts, such as the sulfate or hydrochloride.

As the second intermediate, any N(acyl)-N-(beta-dihalo-gamma halopropyl) para-aminobenzoic acid can be used. It is preferred that the halogens be all alike. However, they can be different. An important group of intermediates I can use are the amino acid amides of N(acyl)-N-(beta-dihalo-gamma halopropyl) para-aminobenzoic acids, such as, the amides formed by reacting an N(acyl)-N-(beta-dihalo-gamma halopropyl) para-aminobenzoic acid with glutamic acid, aspartic acid, glycine, alanine, leucine, insovaline, cysteine and the like. The amino acids may be natural or synthetic and may be in any of the d, l or dl forms. These amino acid amides possess free carboxyl groups, and, as will be apparent, the salts and esters thereof may likewise be employed.

The reaction of the present invention can be carried out at temperatures of from about 20° to about 120° C. although I prefer a temperature of from 70° to about 110° C.

The reaction is usually complete in a matter of half an hour to an hour, although it may extend over a period of 15 minutes to 2 or 3 hours.

It is preferable to carry out the reaction in a mildly alkaline solution such as an aqueous solution of an alkali metal hydroxide. Other solvents can be used such as ethanol, methanol, dioxane and the like which are made mildly alkaline by the addition of compounds such as sodium acetate, sodium carbonate and the like.

The invention is illustrated in greater particularity in the following example, in which pteroic acid is prepared. It will be understood, of course, that this example is merely illustrative of the process and that other important compounds can be prepared by process, such as, pteroylglutamic acid.

A mixture of 34.9 g. sodium carbonate, 90.2 g. p-aminobenzoic acid, and 131.7 g. 2,3-dibrompropene is refluxed fifteen hours in 1300 cc. of ethanol. The reaction mixture is concentrated under reduced pressure to about 500 cc. and then poured into 3 liters of cold water containing 50 cc. of concentrated HCl. The solution is cooled two hours in an ice bath, filtered, and the precipitate washed with water. The precipitate is dried over calcium chloride and crystallized from about 2.3 liters of chloroform using activated charcoal to clarify the solution. A yield of 85.0 g. of N-(beta-bromallyl) para-amino benzoic acid is obtained.

To 20 g. of N-(beta-bromallyl) para-aminobenzoic acid is added 100 cc. acetic anhydride and the mixture refluxed thirty minutes. While the solution is still hot, 18 cc. of water is added in small portions with shaking. The solution is then cooled, filtered, and poured into 1 liter of cold water. The product is filtered off after cooling several hours and dried. On crystallizing from a benzene-chloroform mixture it comes down in large, white crystals. A yield of 21 g. of N-(acetyl)-N(beta-bromallyl) para-aminobenzoic acid having a melting point of 153.5° to 154.5° C. is obtained.

To 5 g. of N(acetyl)-N-(beta-bromallyl) para-aminobenzoic acid dissolved in 40 ml. dry chloroform is slowly added 2.68 g. bromine previously dissolved in 20 cc. of chloroform. After about 5 cc. of bromine solution is added, an oily precipitate begins to form which soon turns to rather sticky yellow crystals. After all the bromine is added, the solution is cooled and filtered. The yellow crystalline precipitate is washed with chloroform and dried in a vacuum desiccator. The product obtained is N(acetyl)-N-(beta-dibromo-gamma-bromopropyl) para-aminobenzoic acid.

To 141 mg. of 2,4,5-triaminopyrimidone-6 dissolved in 10 cc. 0.5 N-sodium hydroxide containing a trace of sodium hydrosulfite is added 458 mg. of N(acetyl)-N(beta-dibromo-gamma-bromopropyl) para-aminobenzoic acid and the solution is heated 1 hour on the steam bath. It is then cooled and neutralized to pH 3–4 with HCl. The yellowish-brown ppt. is centrifuged and washed with water. It is redissolved in dilute alkali and treated with activated carbon. It is then precipitated with acid, washed and dried. The product contained pteroic acid and was active against S. fecalis R.

I claim:
1. A method which comprises reacting together 2,4,5-triamino-6-hydroxy-pyrimidine and a member of the group consisting of N(acyl)-N(beta-dihalo-gamma-halopropyl) para aminobenzoic acids and amino acid amides thereof, whereby compounds having the general formula,

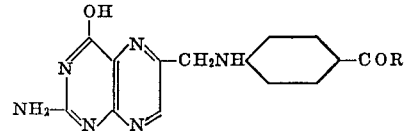

in which R is a member of the group consisting of a hydroxyl radical and an amino acid radical, are produced and recovered.

2. A method which comprises reacting together 2,4,5-triamino-6-hydroxy-pyrimidine and an N(acyl)-N(beta-dihalo-gamma-halopropyl) para-aminobenzoic acid whereby a compound having the general formula,

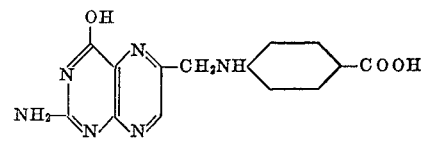

is produced and recovered.

3. A method which comprises reacting together 2,4,5-triamino-6-hydroxy-pyrimidine and N(acetyl)-N(beta-dihalo-gamma-halopropyl) para-aminobenzoic acid whereby a compound having the general formula,

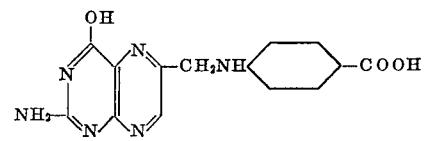

is produced and recovered.

4. A method which comprises reacting together 2,4,5-triamino-6-hydroxy-pyrimidine and N(acetyl)-N(beta-dibromo-gamma-bromopropyl) para-aminobenzoic acid, whereby pteroic acid is produced and recovered.

5. A method which comprises reacting together 2,4,5-triamino-6-hydroxy-pyrimidine and N(acetyl)-N(beta-dichloro-gamma-chloropropyl) para aminobenzoic acid whereby pteroic acid is produced and recovered.

6. A method which comprises reacting together 2,4,5-triamino-6-hydroxy-pyrimidine and N(acetyl)-N(beta-bromo, beta, gamma-dichloropropyl) para-aminobenzoic acid whereby pteroic acid is produced and recovered.

7. A method which comprises reacting together 2,4,5-triamino-6-hydroxypyrimidine and N(acetyl)-N(beta-chloro, beta, gamma-dibromopropyl) para-aminobenzoyl glutamic acid whereby pteroylglutamic acid is produced and recovered.

JAMES H. BOOTHE.

No references cited.